US005613426A

United States Patent [19]
Chan Gabbai

[11] Patent Number: 5,613,426
[45] Date of Patent: Mar. 25, 1997

[54] PIE MAKER

[75] Inventor: Cynthia W. L. Chan Gabbai, Hong Kong, Hong Kong

[73] Assignee: Ying Fat Electric Products Limited, Hong Kong

[21] Appl. No.: 611,011

[22] Filed: Mar. 5, 1996

Related U.S. Application Data

[63] Continuation of Ser. No. 103,243, Aug. 6, 1993, abandoned.

[30] Foreign Application Priority Data

Mar. 31, 1993 [GB] United Kingdom ............... 93 06664.5

[51] Int. Cl.$^6$ ...................................... A47J 37/06
[52] U.S. Cl. .................................. 99/375; 99/381; 99/383
[58] Field of Search ............................. 99/372, 374, 375, 99/377, 378, 380, 381, 382, 383

[56] References Cited

U.S. PATENT DOCUMENTS

| | | | |
|---|---|---|---|
| 1,728,064 | 9/1929 | Johnson | 99/375 |
| 1,874,836 | 8/1932 | Trenner et al. | 99/375 |
| 1,969,361 | 8/1934 | Fajen . | |
| 1,977,084 | 10/1934 | Person | 99/381 |
| 2,078,189 | 4/1937 | Bemis | 99/375 |
| 2,463,439 | 3/1949 | Strietelmeier . | |
| 2,780,163 | 2/1957 | Lee | 99/375 |
| 2,890,317 | 6/1959 | Savignac | 99/378 |
| 3,669,006 | 6/1972 | Lee, Sr. . | |
| 3,719,507 | 3/1973 | Bardeau | 99/375 |
| 4,091,720 | 5/1978 | Wheeler . | |
| 4,163,418 | 8/1979 | Thelander | 99/375 |
| 4,167,900 | 9/1979 | Eichler . | |
| 4,297,941 | 11/1981 | Gallina . | |
| 4,364,308 | 12/1982 | John et al. | 99/372 |
| 5,363,748 | 11/1994 | Boehm et al. | 99/372 |

FOREIGN PATENT DOCUMENTS

| | | |
|---|---|---|
| 513105 | 11/1980 | Australia . |
| 2201334A | 9/1988 | United Kingdom . |
| WOA9108671 | 6/1991 | WIPO . |

Primary Examiner—David Scherbel
Assistant Examiner—James F. Hook
Attorney, Agent, or Firm—Klarquist Sparkman Campbell Leigh & Whinston, LLP

[57] ABSTRACT

A pie maker is disclosed for making a pie having a base, a side wall and a cover. The pie maker comprises a mould assembly to define the shape of the pie. The mould assembly comprises cooperating first and second moulds, the first mould defining the shape of the pie base and the side wall and the second mould defining the shape of the pie cover. Heating elements are provided for heating the first and second moulds to cook the pie, the heating element for heating the first mould being arranged to direct heat to a portion of the first mould which defines the shape of the side wall of the pie. A sealing ridge is formed in the first mould and the second mould for sealing the pie cover and the pie side wall together.

11 Claims, 6 Drawing Sheets

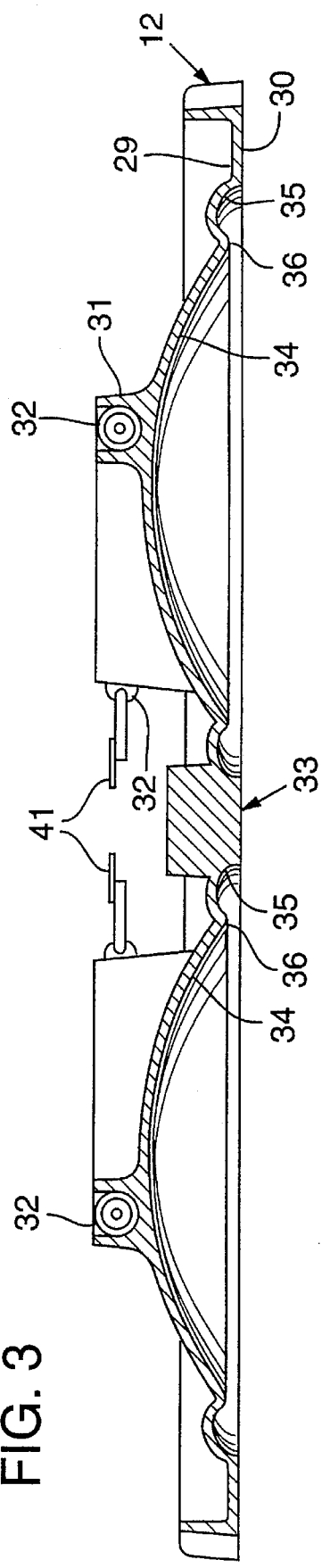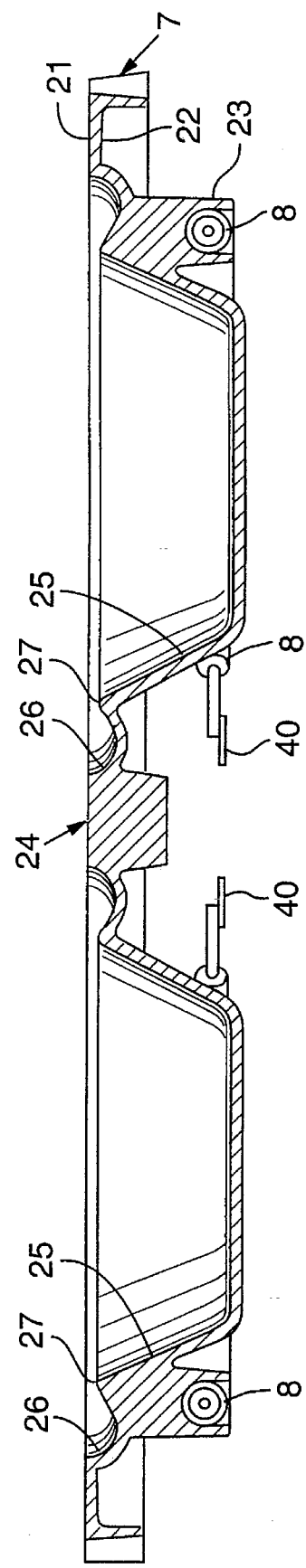

W : 220~240 VAC 640 W $^{+4\%}_{-8\%}$

W1 : 115 VAC 320 W

W2 : 115 VAC 320 W

THERMOSTAT : OPEN 185 ±5 °C
CLOSE 170 ±5 °C

THERMAL CUT-OFF : 216 °C

W : 120 VAC 640 W $^{+4\%}_{-8\%}$

W1 : 120 VAC 320 W

W2 : 120 VAC 320 W

THERMOSTAT : OPEN 185 ±8 °C
CLOSE 170 ±5 °C

THERMAL CUT-OFF: 216 °C

PIE MAKER

This application is a continuation of application Ser. No. 08/103,243, filed on Aug. 6, 1993, now abandoned.

The present invention relates to a pie maker and a method of making pies. More particularly, the invention relates to a pie maker for making a pie having a base, a side wall and a cover, which pie maker comprises in the mould assembly a mould assembly to define the shape of the pie and heating elements for cooking the pie.

A conventional method of making pies in an oven requires the use of an oven and a pie-dish. The pie base is formed in the pie dish and the pie cover is placed on the pie base when filled with a desired filling. The pie is cooked by convection means in the oven. This is a lengthy process and is not available to people without ovens or to offices or the like without kitchen facilities.

Accordingly, one aspect of the present invention provides a pie maker for making a pie having a base, a side wall and a cover, which pie maker comprises a mould assembly to define the shape of the pie and comprising co-operating first and second moulds, the first mould defining the shape of the pie base and the side wall and the second mould defining the shape of the pie cover, heating means for heating the first and second moulds to cook the pie, the heating means for heating the first mould comprising a heating element arranged to direct heat to a portion of the first mould which defines the shape of the side wall of the pie.

A further aspect of the present invention provides a pie maker for making a pie having a base, a side wall and a cover, which pie maker comprises a mould assembly to define the shape of the pie and comprising co-operating first and second moulds, the first mould defining the shape of the pie base and the side wall of the pie and the second mould defining the shape of the pie cover, heating means for heating the first and second moulds to cook the pie, and sealing means formed on the first mould and the second mould for sealing pie cover and the pie side wall together.

Another aspect of the present invention provides a method comprising the steps of: locating a first piece of pastry in a first mould; locating a second piece of pastry in a second mould; forming the pastry into the shape of the moulds; placing a filling in the cavity defined in one of the moulds; placing the first mould on top of the second mould; heating the pie sufficiently to cook the pie; and sealing the pie with sealing means provided on the first and second moulds.

In order that the present invention may be more readily understood, an embodiment thereof will now be described, by way of example, with reference to the accompanying drawings, in which:

FIG. 3 is a cross section of a pie cover mould for use in the pie maker of FIG. 1;

FIG. 4 is a cross section of a pie base mould for use in the pie maker of FIG. 1;

Figure 1:
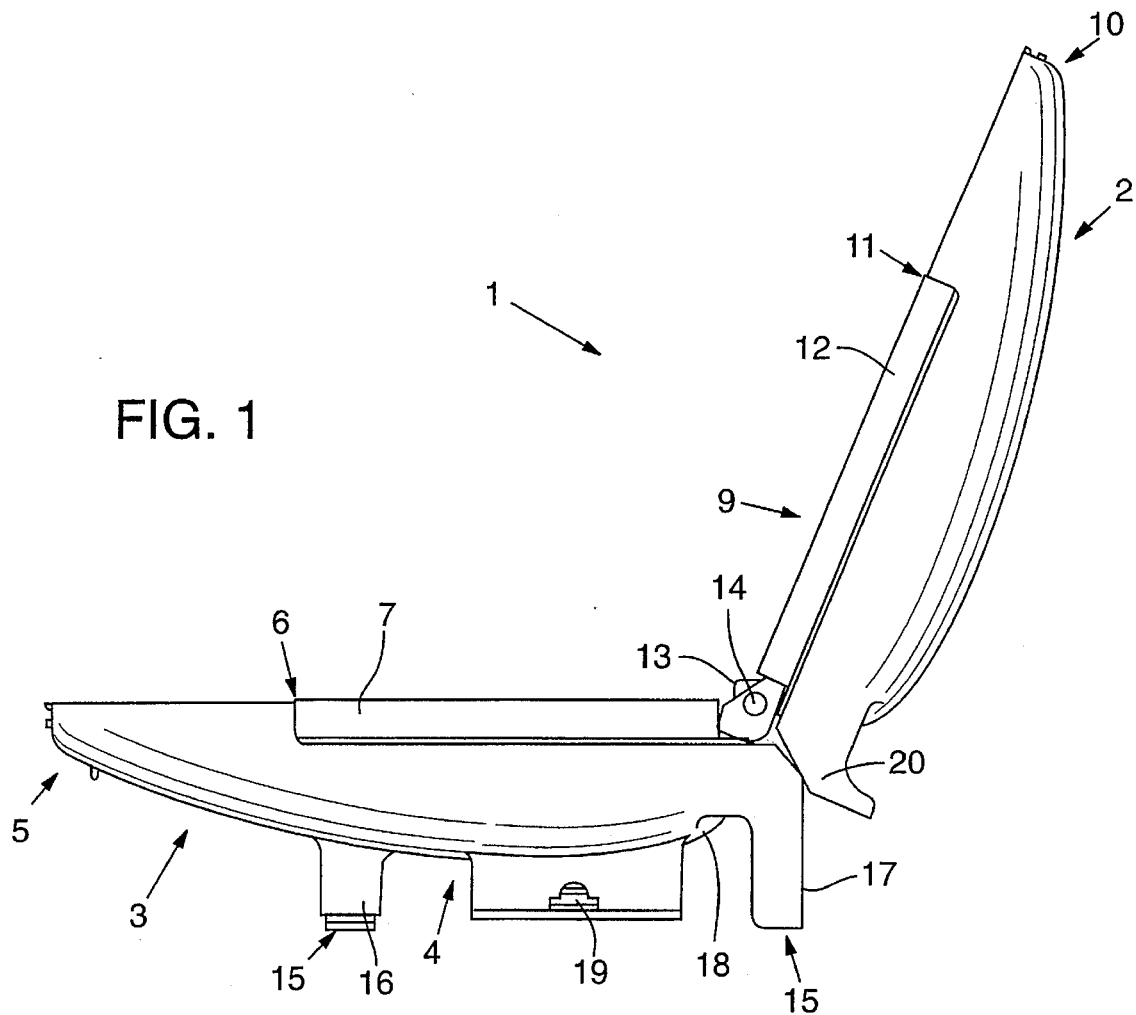
FIG. 1 is a diagrammatic view of a pie maker according to one embodiment of the present invention in an open configuration.
Figure 2:
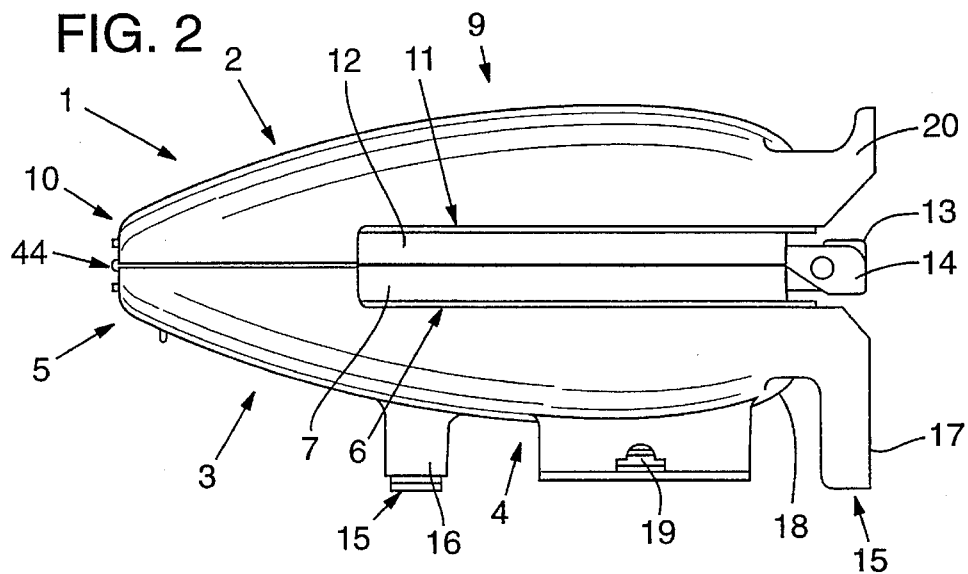
FIG. 2 is a diagrammatic view of the pie maker of FIG. 1 in a closed configuration.

FIGS. 1 and 2 show a pie maker 1 in accordance with one embodiment of the present invention which comprises two separate halves, which halves consist of an upper casing 2 and a lower casing 3.

Figure 7:
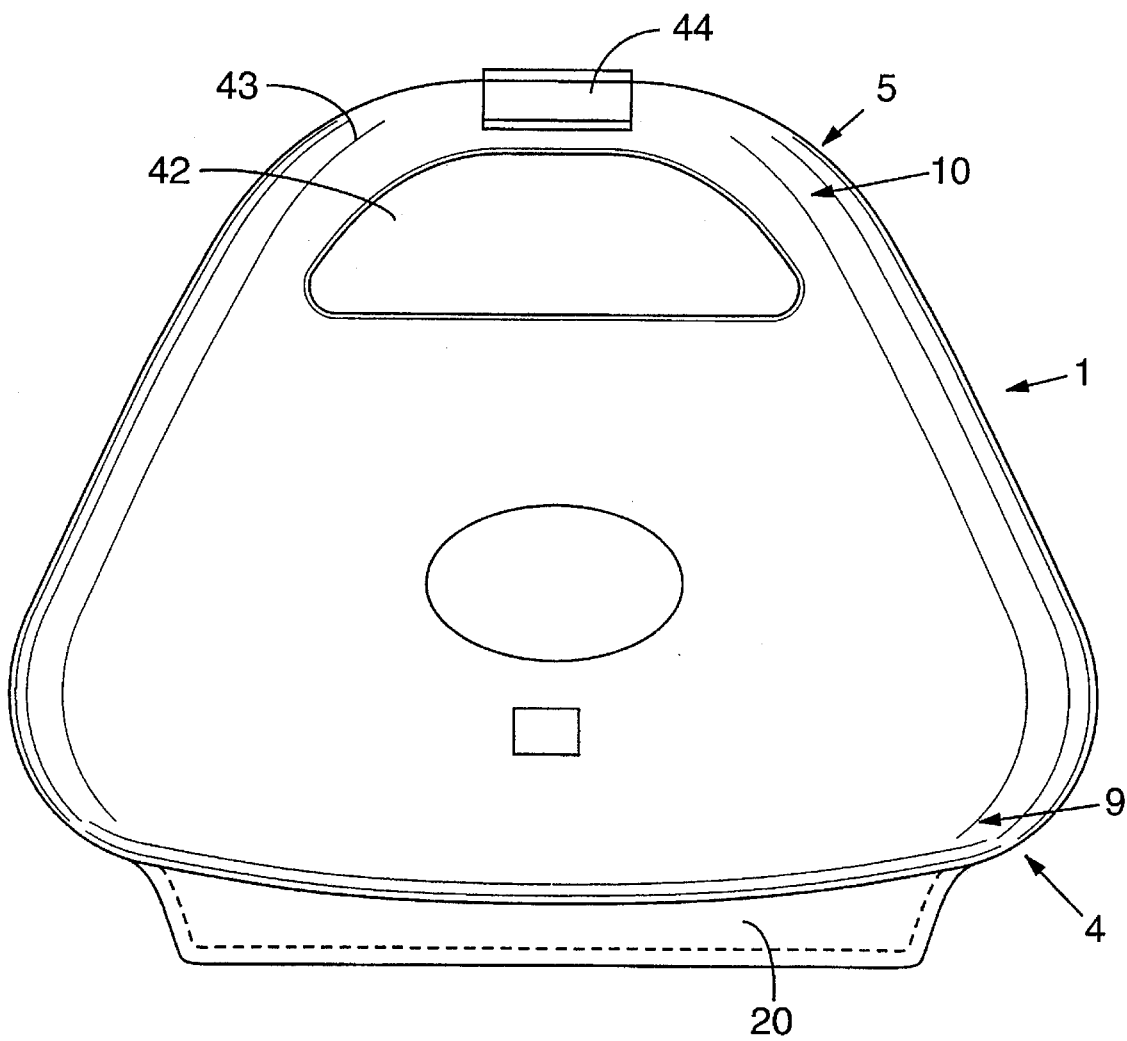
FIG. 7 is a plan view of the pie maker of FIG. 1.

In the plan view of FIG. 7, the lower casing 3 presents a generally ovoid outline enclosing a wide region 4 and a tip region 5 of the casing 3. The wide region 4 comprises a substantially rectangular receiving portion 6 which receives a pie base mould 7 and a lower casing heating element 8.

The upper casing 2 also presents a generally ovoid outline enclosing a wide region 9 and a tip region 10. The wide region 9 comprises a substantially rectangular receiving portion 11 which receives a pie cover mould 12 also of a substantially rectangular shape.

The upper casing 2 is attached to the lower casing 3 by two hinges 13,14 and the lower casing 3 has a base 15 for supporting the pie maker 1 on a flat surface such as the work surface in a kitchen.

The base 15 consists of two tubular legs 16, which project downwardly from the lower casing 3 adjacent the tip region 5 of the lower casing and two leg blocks 17 which extend horizontally from a perpendicular rear surface 18 of the pie maker 1 and which then extend downwardly to the same extent as the tubular legs 16, thus providing a level platform for the lower casing 3. The base 15 spaces the lower casing 3 from the work surface by a distance which is sufficient to enable a power supply socket 19 to be located on the underside of the lower casing 3. A suitable power supply plug (not shown) can be inserted in the power supply socket 19 to provide a power supply to the pie maker 1. The lower casing 3 of the pie maker is also spaced from the work surface by the base 15 to prevent damage to the work surface which could be caused when the pie maker is in use.

The wide region 9 of the ovoid upper casing 2 is provided with a flange 20 which runs along the rear of the upper casing 2. When the pie maker is in the open configuration shown in FIG. 1, two portions of the flange 20 abut the leg blocks 17 of the base 15 to prevent the pie maker from opening more than approximately 100°. Thus, the upper casing 2 of the pie maker can be left in either the closed or the open configuration.

Figure 5A:
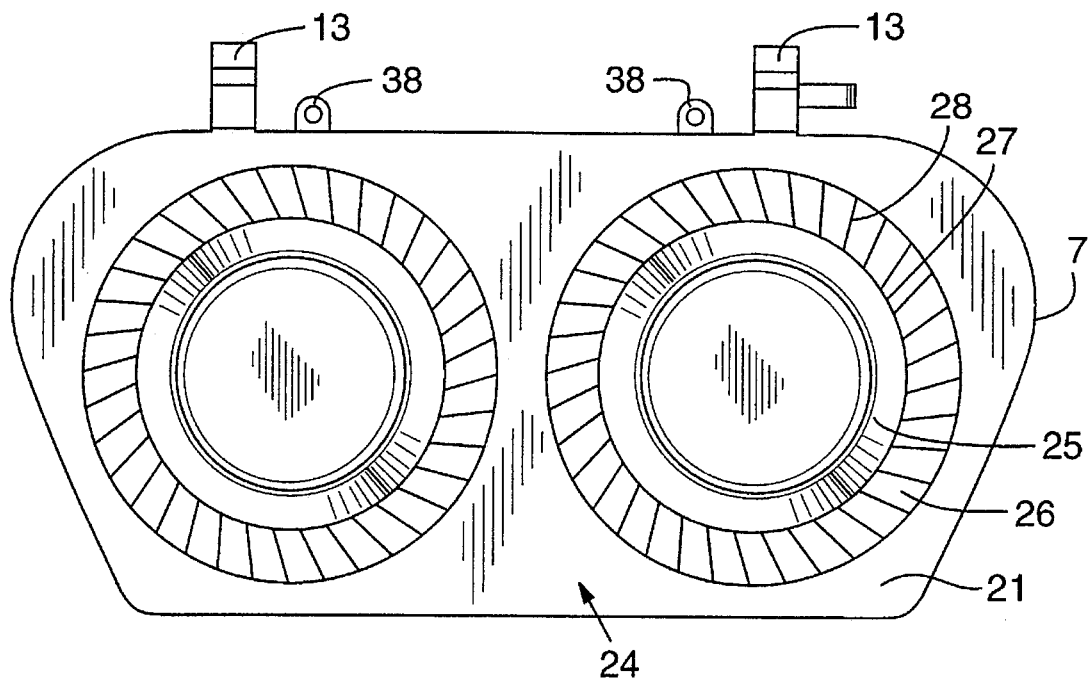
FIG. 5A is a plan view of a top surface of the pie base mould of FIG. 4.
Figure 5B:
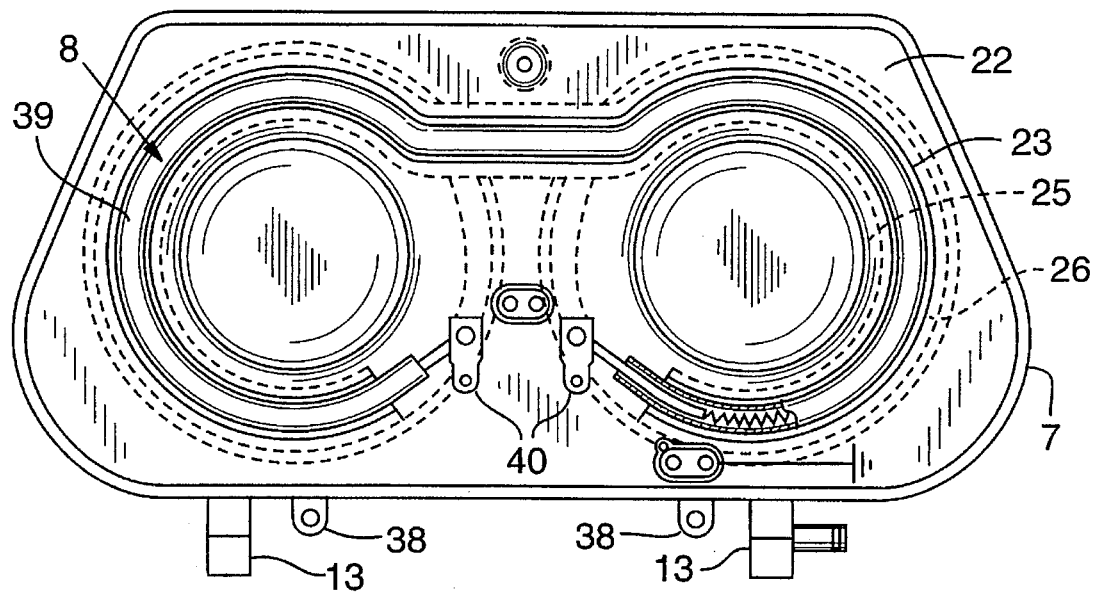
FIG. 5B is a plan view of the location of a lower casing heating element on a bottom surface of the pie base mould of FIG. 4.

As shown in FIGS. 4, 5A and 5B, the pie base mould 7 has a top surface 21 and a bottom surface 22. The top surface 21 defines the shape of the pie base and the bottom surface 22 includes securing means 23 for securing the lower casing heating element 8 to the pie base mould 7. The securing means 23 comprises a channel formed to receive the lower case heating element 8 in force fit engagement.

The top surface 21 of the pie base mould 7 which defines the shape of the pie base consists of a planar surface 24 formed with two identical spaced apart frustum shaped depressions 25 which are each surrounded by a shallower annular depression 26. A circular sealing ridge 27 is defined between the annular depression 26 and the frustum shaped depression 25 which acts as one half of a sealing means for sealing a pie. The surface of each shallow annular depression 26 is formed with upwardly projecting teeth 28 (see FIG. 5A) at regular intervals around the annular depression 26, each tooth 28 extending substantially radially from the sealing ridge 27 to an outer circumference of the shallow annular depression 26.

Figure 6A:
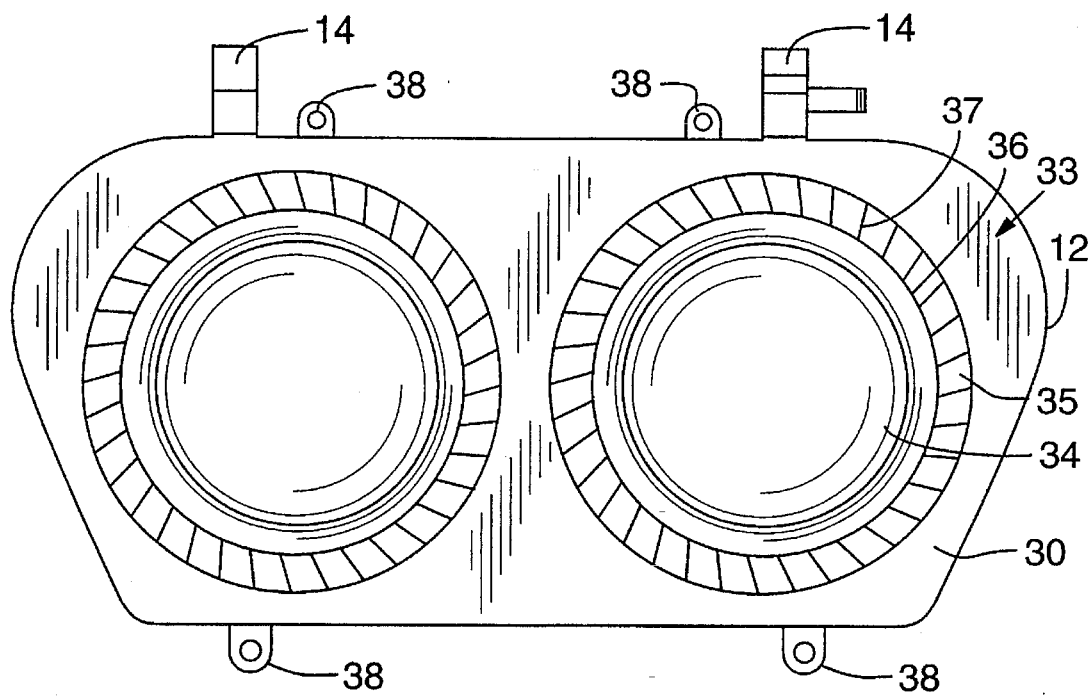
FIG. 6A is a plan view of a bottom surface of the pie cover mould of FIG. 3.
Figure 6B:
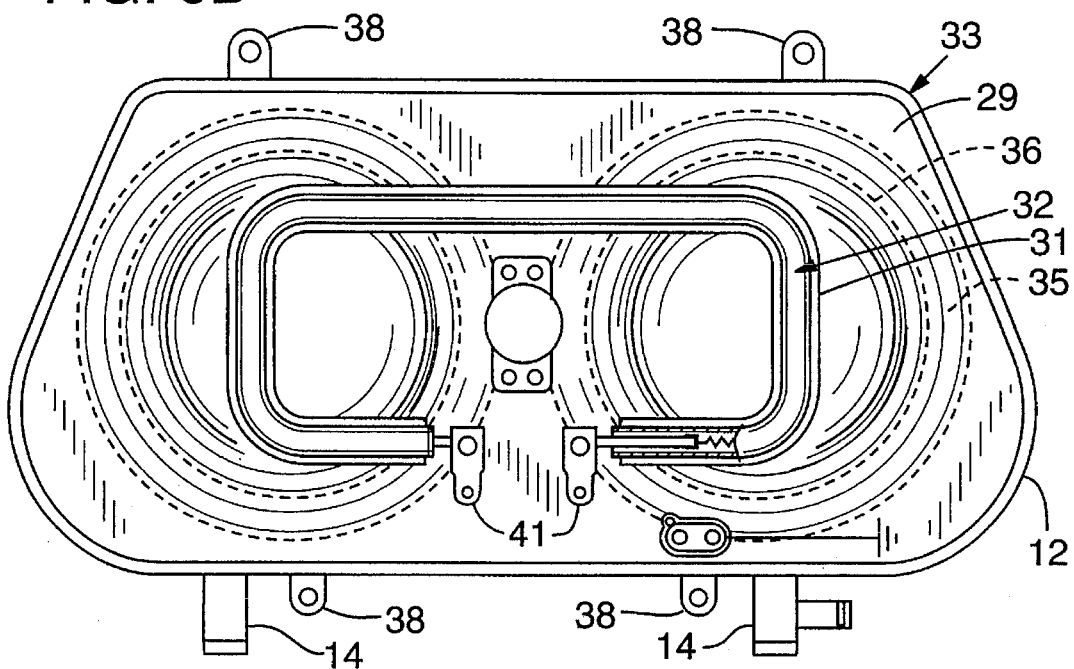
FIG. 6B is a plan view of an upper casing heating element on a top surface of the pie cover mould of FIG. 3.

As shown in FIGS. 3, 6A and 6B, the pie cover mould 12 has a top surface 29 and a bottom surface 30, the bottom surface 30 defining the pie cover shape and the top surface 29 having securing means 31 for securing an upper casing heating element 32 to the top surface 29 of the pie cover mould 12.

The bottom surface 30 of the pie cover mould 12 consists of a planar surface 33 formed with two identical spaced apart dome shaped depressions 34 which are each surrounded by a shallower annular depression 35 identical to the annular depressions 26 in the top surface 21 of the pie base mould 7. A circular sealing ridge 36 is defined between the annular depression 35 and the dome shaped depression 34 which acts as the other half of the sealing means for sealing a pie. In a similar manner to the annular depressions 26 in the top surface 21 of the pie base mould 7, the surface of each shallow annular depression 35 in the bottom surface 30 of the pie cover mould 12 is formed with upwardly projecting tooth 37 (see FIG. 6A) at regular intervals around the annular depression 35, each tooth 37 extending substantially radially from the sealing ridge 36 to an outer circumference of the shallow annular depression 35.

The pie base mould 7 and the pie cover mould 12 are secured in the lower casing and the upper casing receiving portions 6,11 respectively by tabs 38 through which a securing means such as a screw or nut and bolt may be fastened to secure the moulds 7,12 to the casings 3,2. Thus, the respective heating elements 8,32 are sandwiched between their respective casing 3,2 and their respective mould 7,12.

The lower casing heating element 8 comprises two sections, a first section 39 which is substantially circular and surrounds the substantially upright sides of one of the frustum shaped depressions 25 formed in the pie base mould 7 and a second similar section which surrounds the upright sides of the other frustum shaped depression 25 formed in the pie base mould 7. The two sections of the lower casing heating element 8 are joined at one side and terminate on the other side at two opposed ends. The opposed ends are each connected to electrical contacts 40 which are supplied with a suitably rated power supply to heat the heating element 0.

The upper casing heating element 32 comprises a length of heating element material having a specified power rating which is shaped in the form of a "C" as shown in FIG. 5. The two opposed ends of the upper casing heating 32 element terminate at two electrical contacts 41 also carrying a suitably rated power supply to heat the heating element.

The ovoid shape of the pie maker allows the pie base and pie cover moulds 7,12 to be secured in the wider regions 4,9 of the upper and lower casings 3,2 whilst the tip regions 5,10 of the casings 3,2 defines a handle area. A substantially semi circular opening 42 is formed in both the upper and lower casings in corresponding locations such that, when the pie maker is in the closed configuration shown in FIG. 2, the two openings 42 face one another and define a handle 43. Additionally, the tip portion 10 of the upper casing 2 is provided with a catch 44 which, when the pie maker is in the closed configuration, can be closed to engage the tip regions 5,10 of both the lower and upper casings in a secure fashion to prevent the pie maker from opening.

In the closed configuration shown in FIG. 2, the pie cover mould 12 closes upon the pie base mould 7 such that the two moulds come together to define the shape of the pie.

Figure 8A:
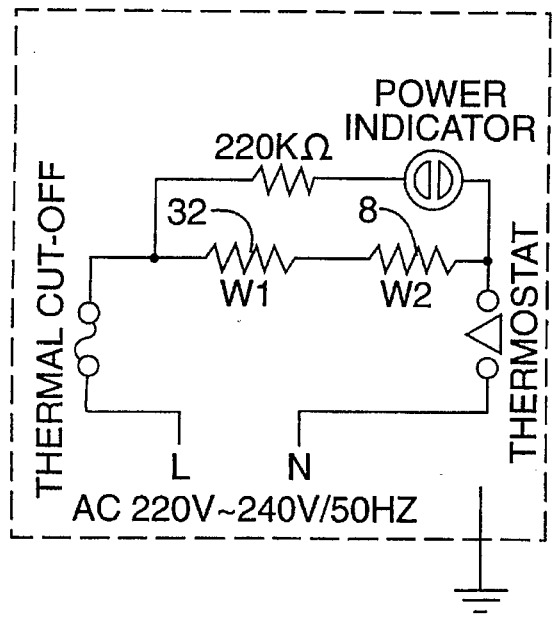
FIGS. 8A and 8B are schematic circuit diagrams showing two alternative methods of wiring the heating elements in the pie maker of FIG. 1.
Figure 8B:
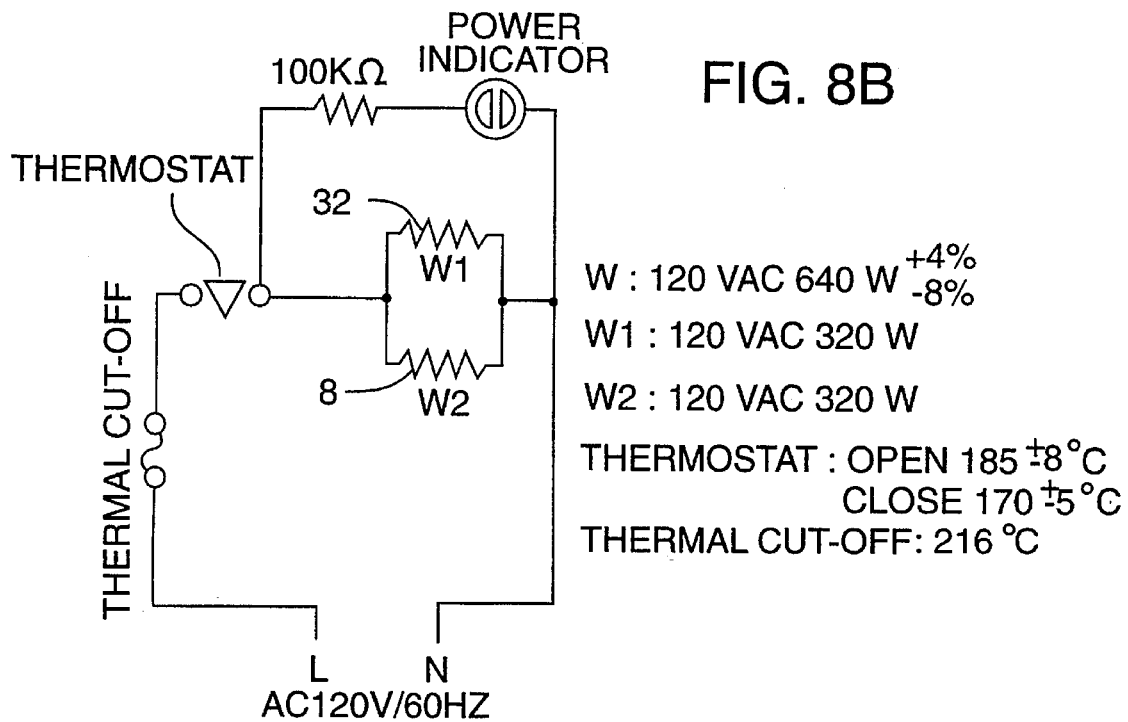

The upper and lower heating elements 8,32 are shown in FIG. 8A as being wired in series with one another for a 220–240 v/50 Hz AC supply. FIG. 8B shows the heating elements wired in parallel with one another for a 120 v/60 Hz AC supply. In both circuits a thermostat 45 is provided in series with the heating elements 8,32 to maintain the heating elements 0,32 at the optimum cooking temperature. In the described embodiment the thermostat 45 is rated to open at 185°±8° or more and to close at 170°±8° or less.

In use, the pie maker 1 is opened as shown in FIG. 1 and a substantially circular piece of rolled pastry is pressed into each of the two frustum shaped depressions 25 of the pie base mould 7 so that the pastry is moulded to the desired shape of the pie base. The pastry is of sufficient diameter to form an annular lip which extends out of the frustum shaped depression 25 and over the surrounding sealing ridge 27 and annular depression 26. A pie filling such as steak and kidney or mincemeat is placed in the pie base to almost fill the pie base. A second substantially circular piece of pastry is pressed into each of the dome shaped depressions 34 in the pie lid mould 12, the second piece of pastry extending over the annular depression 35 on the bottom surface 30 of the pie cover mould 12. The upper casing 2 is closed onto the lower casing 3 such that the pie cover mould 12 aligns with the pie base mould 7. The closing of the pie maker into the closed configuration shown in FIG. 2 sandwiches the pastry in the pie base mould 7 and the pie lid mould 12 between the annular ridges 27,36 in the pie base mould 7A and the pie lid mould 12 together causing the rims of the pies to be sealed. The teeth 28,37 formed in the annular depressions 26,35 impress a criss-cross pattern into the pie rims. The heating elements 8,32 are turned on and the pies are left in the pie maker until the pies are thoroughly cooked and the pie maker can then be opened and the pies removed. Alternatively, the pastry for the pie cover can simply be placed over the filled pie base and the pie maker closed rather than pressing the pastry into the pie cover mould 12.

The embodiment of the pie maker shown in the drawings can produce two pies. It is envisaged that a mould assembly single pie or a pie mould including spaces for three or more pies may be used.

Although, the pie maker shown in the drawings makes traditional circular pies, it is envisaged that the pie moulds may be exchangeable to allow pies of different shapes to be made by replacing the illustrated moulds with differently shaped moulds.

I claim:

1. A pie maker for making a pie having a base, a side wall and a cover, which pie maker comprises:
   (a) a mould assembly comprising cooperating first and second moulds that are connected together for relative pivotal movement between an open position in which said first and second moulds are moved apart, and a closed position in which said first and second moulds are brought together, the first mould defining a frusto-conical cavity having a base portion adapted to substantially fully contact and thus define the shape of the pie base, and a side wall portion adapted to substantially fully contact and thus define the shape of the side wall of the pie; and the second mould defining a dome-shaped cavity adapted to substantially fully contact and thus define the shape of the pie cover, the mould assembly further comprising a sealing ridge adapted, whenever the first and second moulds are in the closed position, to circumferentially seal the pie cover to the side wall of the pie; and
   (b) heating means for heating the first and second moulds to cook the pie, the heating means for heating the first mould being disposed relative to said side wall portion of said first mould so as to direct heat to said side wall portion of the first mould.

2. A pie maker according to claim 1, wherein the heating means for heating the first mould is a heating element arranged to enclose a substantial part of the side wall portion of the first mould.

3. A pie maker according to claim 1 or 2, wherein the heating means for heating the second mould is a heating element contacting the second mould to heat the pie cover.

4. A pie maker according to claim 1, wherein the heating means are sandwiched between an outer casing of the pie maker and the moulds, the heating means for heating the first mould being secured to the first mould in a channel substantially surrounding the first mould.

5. A pie maker according to claim 1, wherein the first and second moulds each define a sealing ridge, the sealing ridges being adapted to cooperatively seal the pie cover and the pie side wall circumferentially together whenever the first and second moulds are in the closed position.

6. A pie maker according to claim 1, wherein the first mould further defines an annular depression surrounding the frustrum shaped depression, and the second mould further defines an annular depression surrounding the dome-shaped depression.

7. A pie maker according to claim 6, further comprising a first circular sealing ridge disposed between the frustrum shaped depression and the surrounding annular depression in the first mould and a second circular sealing ridge disposed between the dome shaped depression and the surrounding annular depression in the second mould, the first and second sealing ridges being adapted to cooperatively seal the pie cover circumferentially to the pie side wall upon movement of said moulds into said closed position.

8. A pie maker according to claim 7, wherein at least one of the annular depressions is formed with radially extending teeth which further seal the pie and impress a pattern upon the pie rim.

9. A pie maker according to claim 1, further comprising a catch for locking the first and second moulds together in a closed configuration.

10. A pie maker for forming and cooking a pie having a base, a side wall, and a cover, the pie maker comprising:

a first mould defining a depression having a flat bottom, a frusto-conical side wall, a sealing ridge forming a rim around the side wall, and an annular depression surrounding the rim, wherein the flat bottom and side wall serve to substantially fully contact and thus define the base and side wall, respectively, of the pie;

a second mould adapted to cooperatively interact with the first mould so as to provide a space for forming and cooking the pie, the second mould defining a dome-shaped depression serving to substantially fully contact and thus define the pie cover, a sealing ridge forming a rim around the dome-shaped depression and having a diameter substantially identical to the diameter of the sealing ridge of the first mould, and an annular depression surrounding the rim, the sealing ridges of the first and second moulds facilitating, whenever the first mould is cooperatively engaged with the second mould, to attach and seal the pie cover circumferentially to the side wall of the pie;

a first electrical heating element for heating the first mould sufficiently to cook the pie, the first heating element situated between the flat bottom and the rim of the depression defined by the first mould and arranged circumferentially to the frusto-conical side wall so as to direct heat, when cooking the pie, to the side wall of the pie; and a second electrical heating element for heating the second mould whenever the first heating element is heating the first mould so as to cook the pie.

11. A pie maker according to claim 10, further comprising a catch for locking the first and second moulds together in a closed configuration.

\* \* \* \* \*

UNITED STATES PATENT AND TRADEMARK OFFICE
CERTIFICATE OF CORRECTION

PATENT NO. : 5,613,426
DATED : March 25, 1997
INVENTOR(S) : Cynthia W. L. Chan Gabbai It is certified that error appears in the above-identified patent and that said Letters Patent is hereby corrected as shown below:

Column 4, line 1, "heating elements 0,32" should be --heating elements 8,32--.

Signed and Sealed this

Twenty-eighth Day of October, 1997

Attest:

BRUCE LEHMAN

Attesting Officer     Commissioner of Patents and Trademarks